Figure 1:
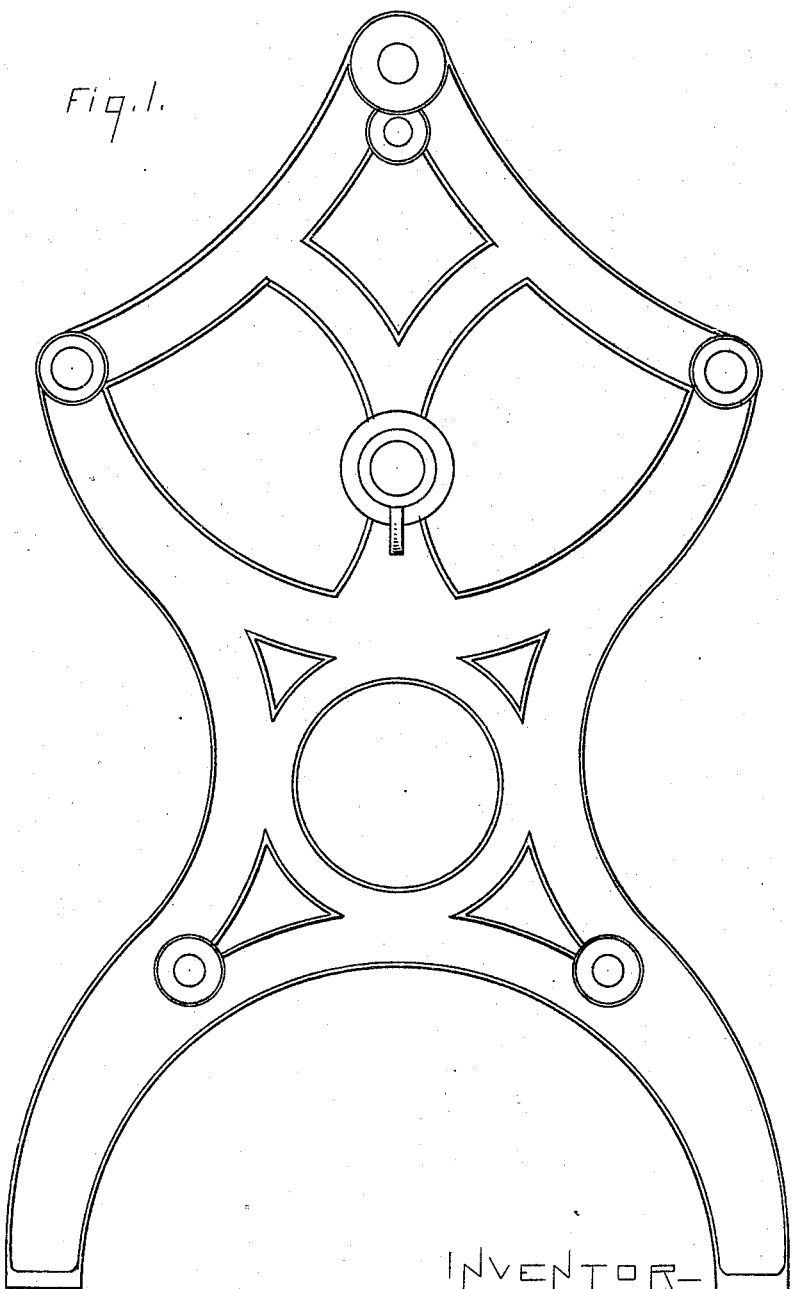

(No Model.)

17 Sheets—Sheet 1.

G. W. PACKER.
HOOP MAKING MACHINE.

No. 368,605.

Patented Aug. 23, 1887.

WITNESSES—
W. C. Weibler
C. L. Manahan

INVENTOR—
George W. Packer
By Manahan & Ward
His Attorneys.

(No Model.)

17 Sheets—Sheet 4.

G. W. PACKER.
HOOP MAKING MACHINE.

No. 368,605. Patented Aug. 23, 1887.

(No Model.)
G. W. PACKER.
HOOP MAKING MACHINE.
No. 368,605.
17 Sheets—Sheet 6.
Patented Aug. 23, 1887.
Fig. 6.
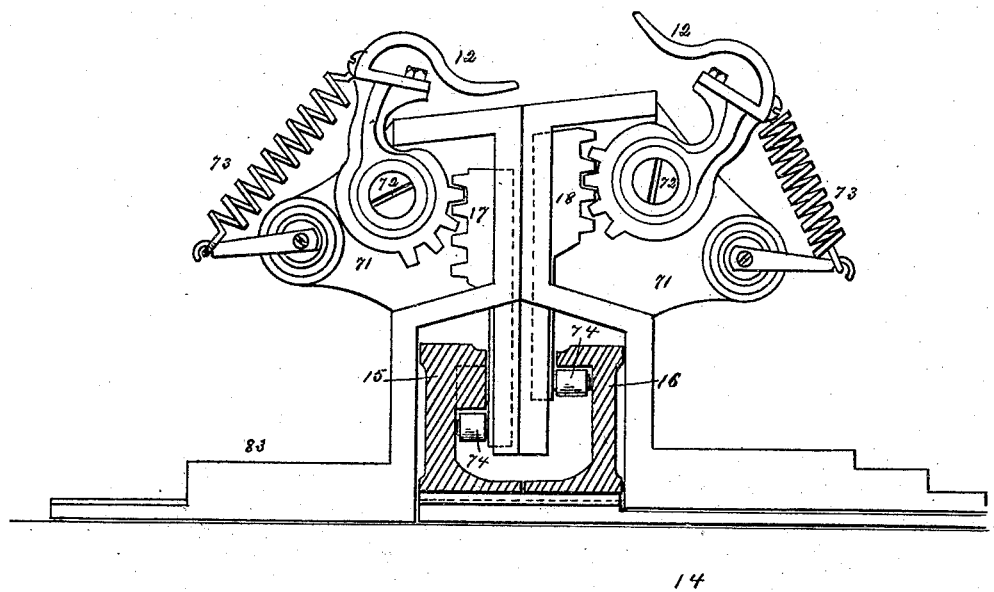
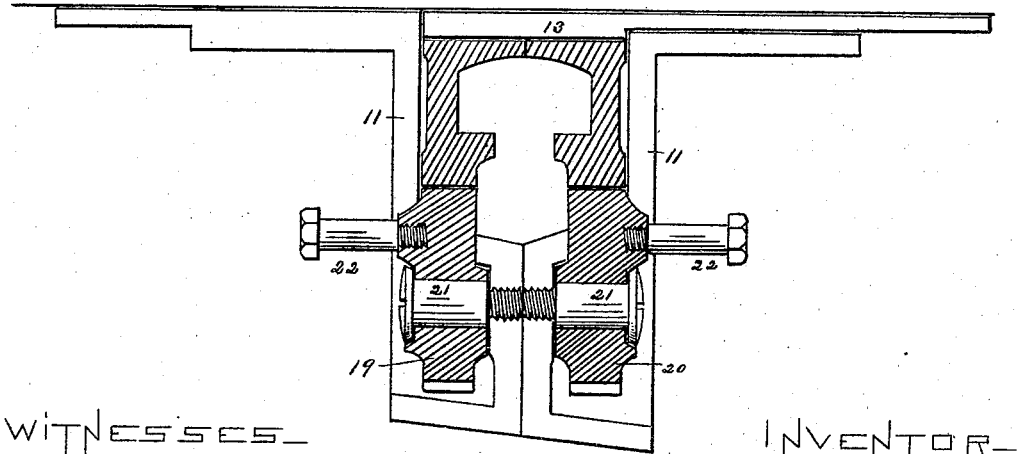
WITNESSES
W. E. Weibler.
C. L. Manahan
INVENTOR
George W. Packer
By Manahan & Ward
His Attorneys (No Model.)
G. W. PACKER.
HOOP MAKING MACHINE.
No. 368,605. Patented Aug. 23, 1887.
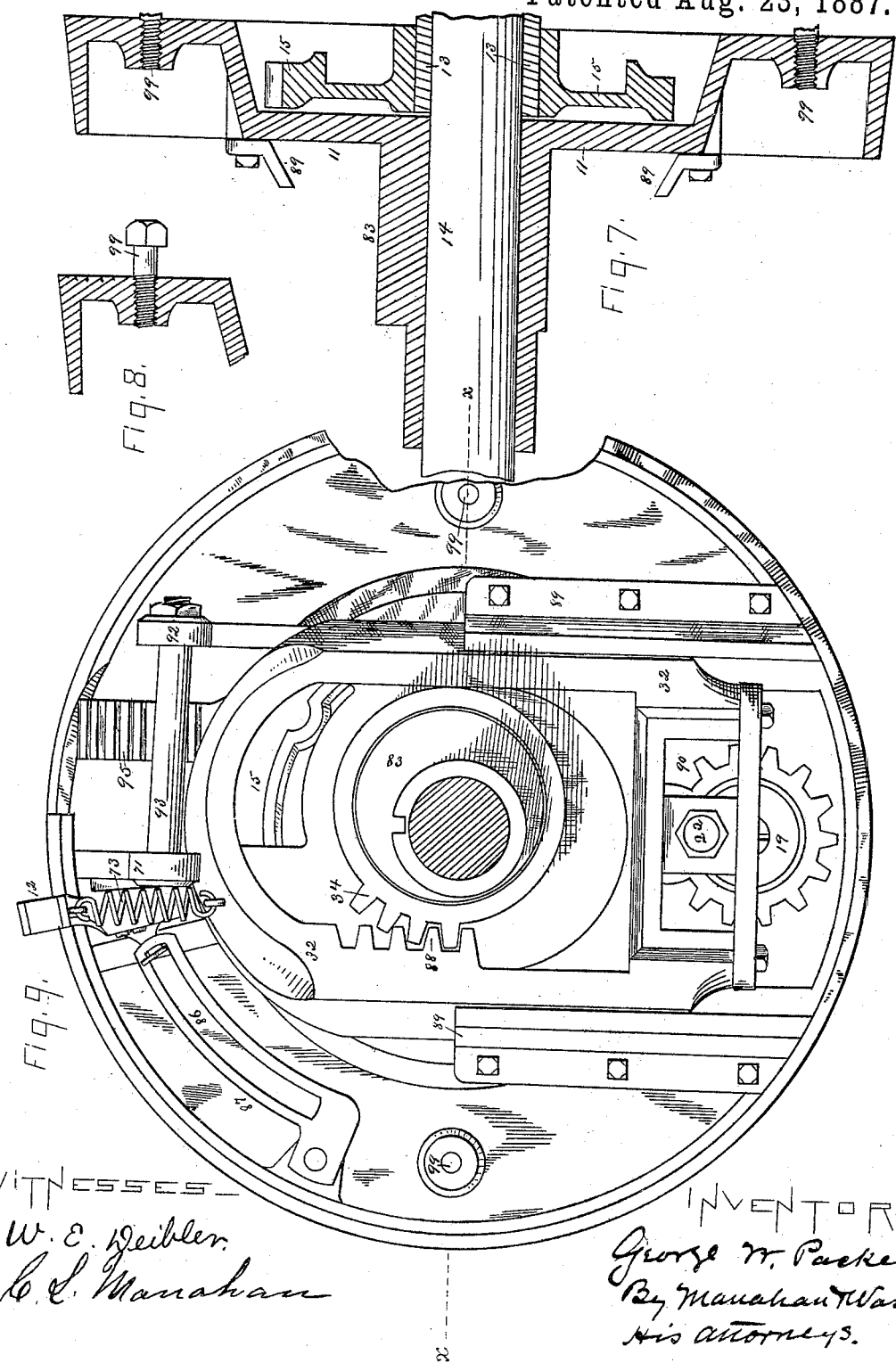
WITNESSES
W. E. Weibler.
C. L. Manahan
INVENTOR
George W. Packer
By Manahan & Ward
His Attorneys.

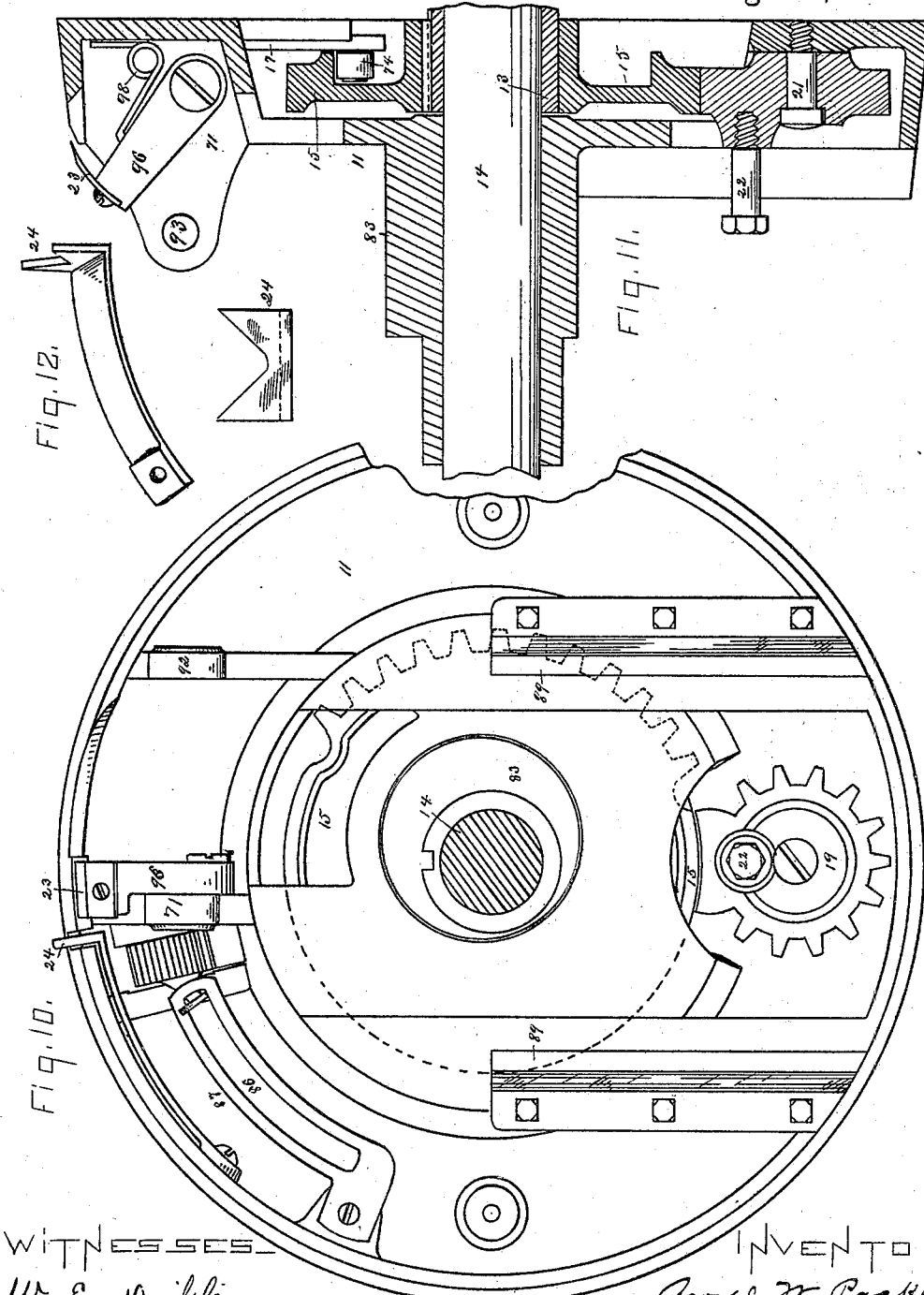

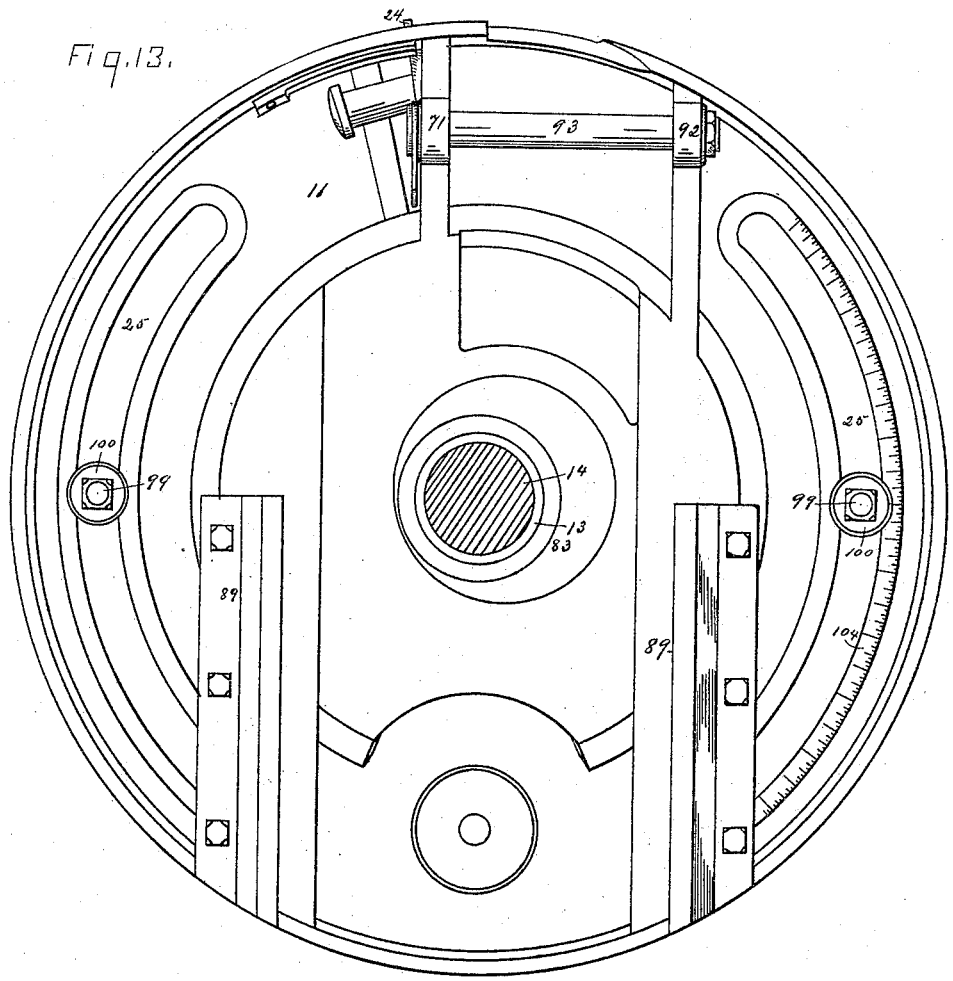

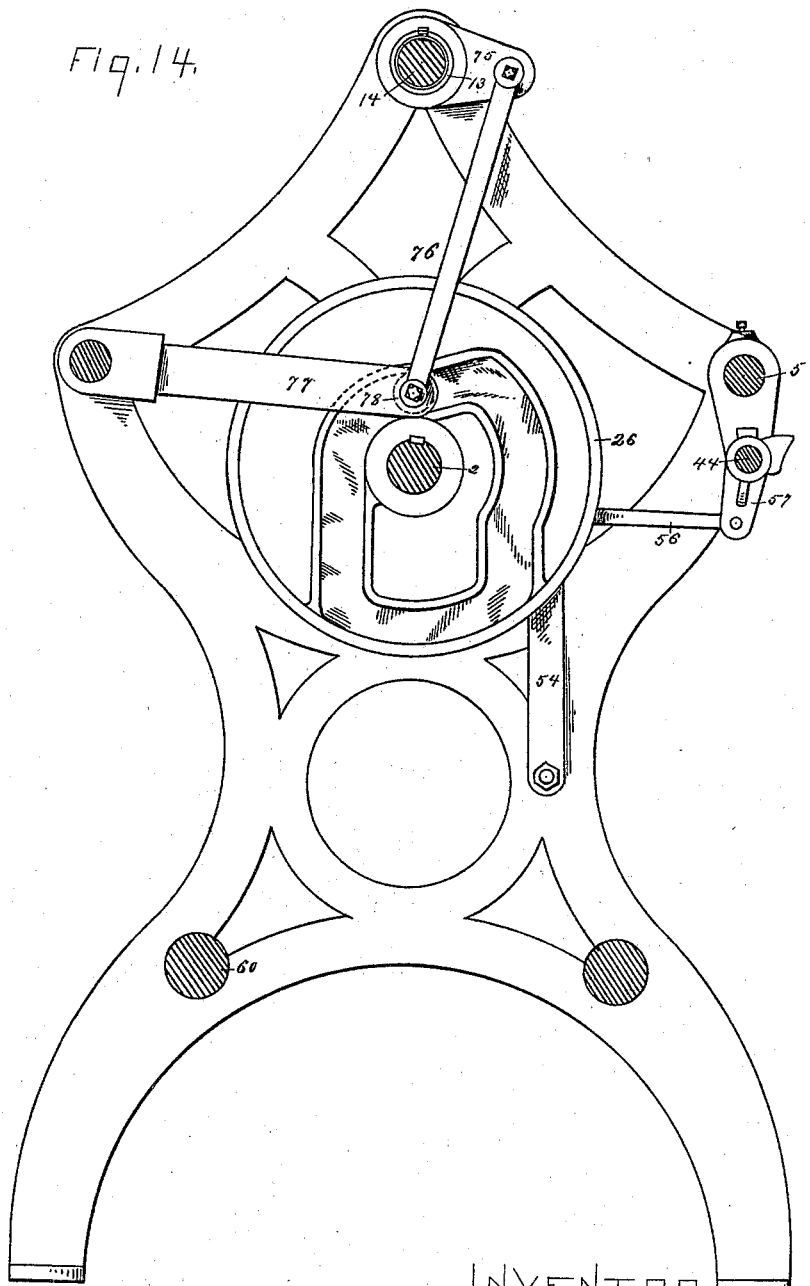

(No Model.) 17 Sheets—Sheet 11.

G. W. PACKER.
HOOP MAKING MACHINE.

No. 368,605. Patented Aug. 23, 1887.

WITNESSES
W. E. Deibler
C. L. Manahan

INVENTOR
George W. Packer
By Manahan & Ward
His attorneys (No Model.) 17 Sheets—Sheet 12.
G. W. PACKER.
HOOP MAKING MACHINE.
No. 368,605. Patented Aug. 23, 1887.
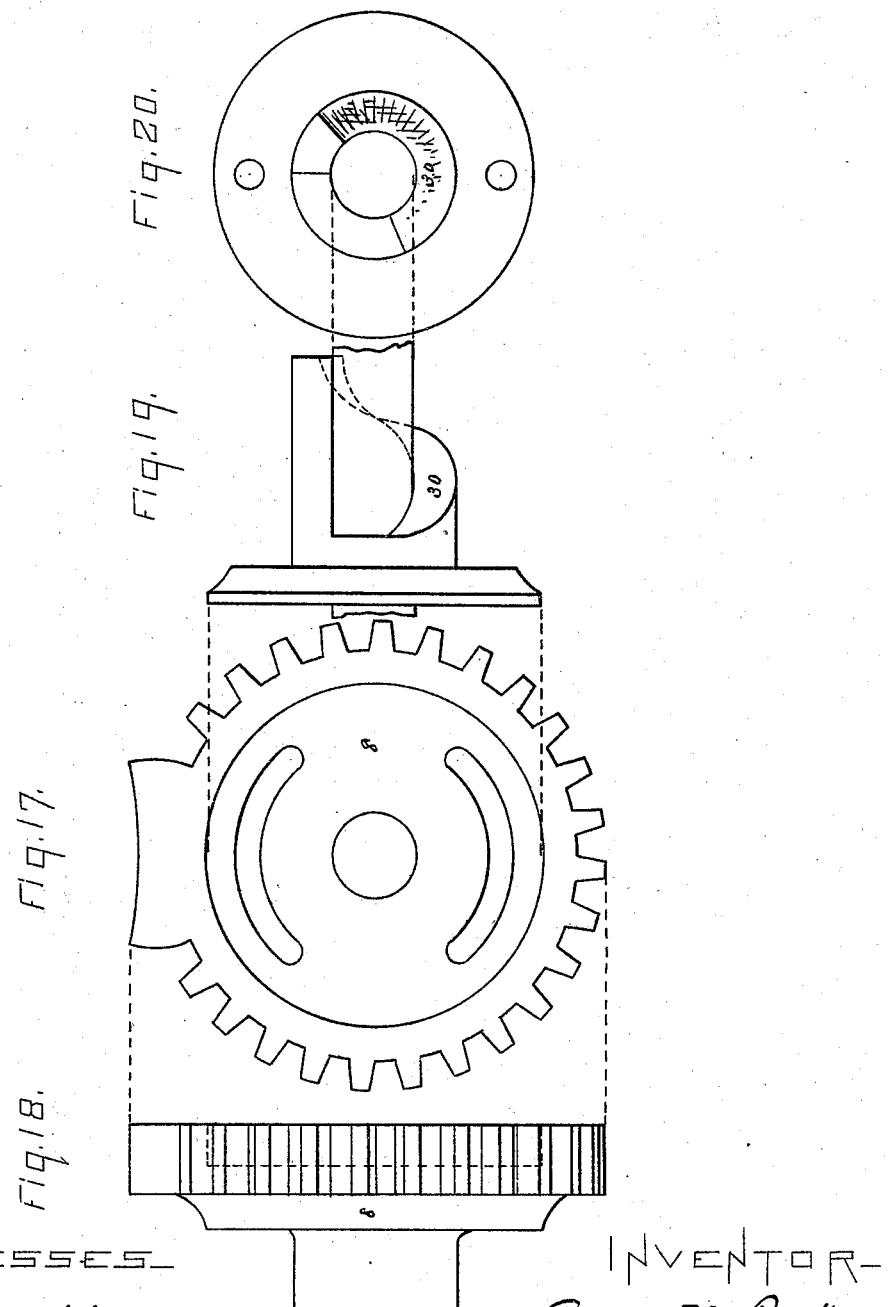

(No Model.)  17 Sheets—Sheet 13.

G. W. PACKER.
HOOP MAKING MACHINE.

No. 368,605.  Patented Aug. 23, 1887.

WITNESSES
W. C. Deibler
C. L. Manahan

INVENTOR
George W. Packer
By Manahan & Ward
His Attorneys.

(No Model.) 17 Sheets—Sheet 14.
G. W. PACKER.
HOOP MAKING MACHINE.
No. 368,605. Patented Aug. 23, 1887.
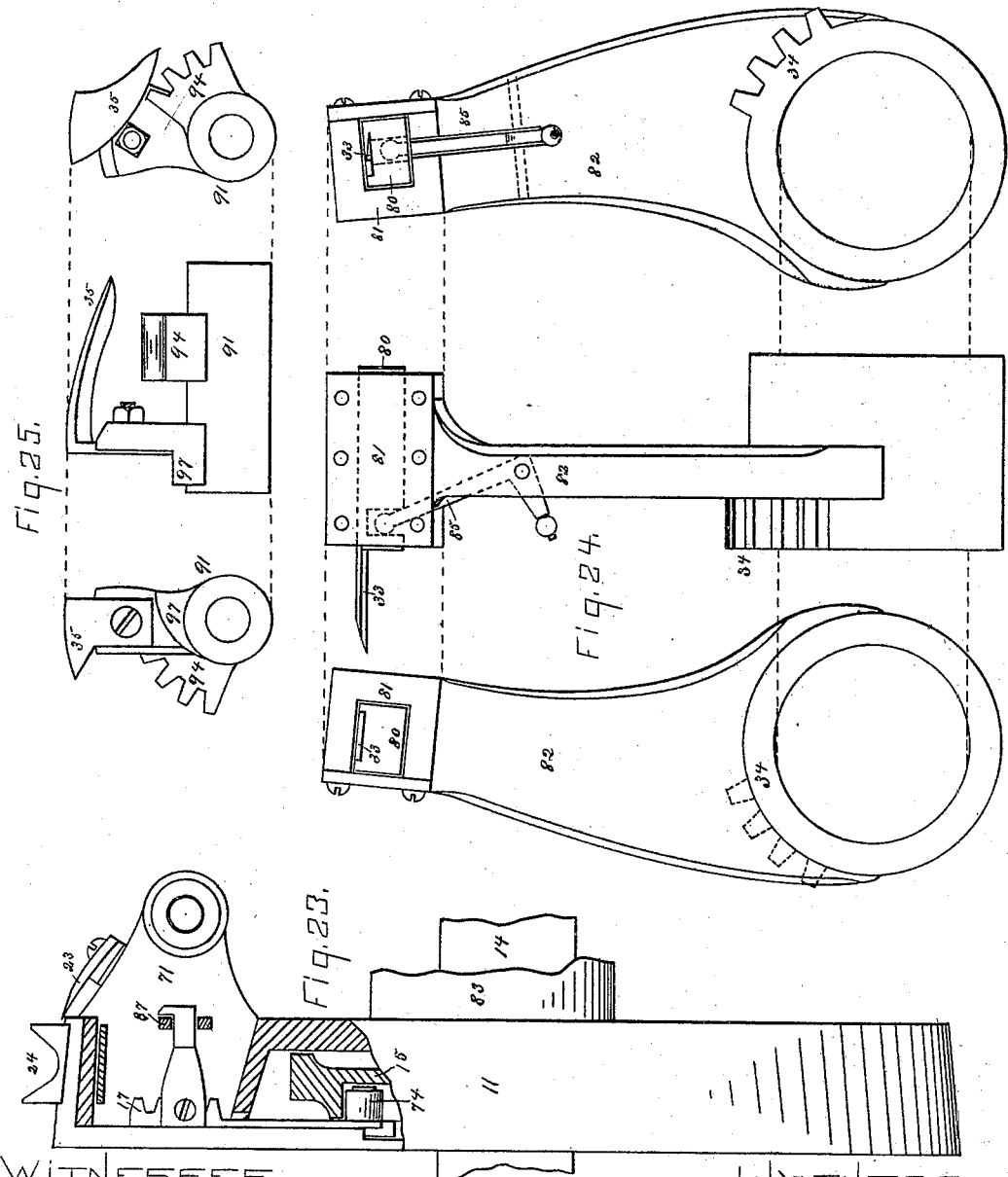

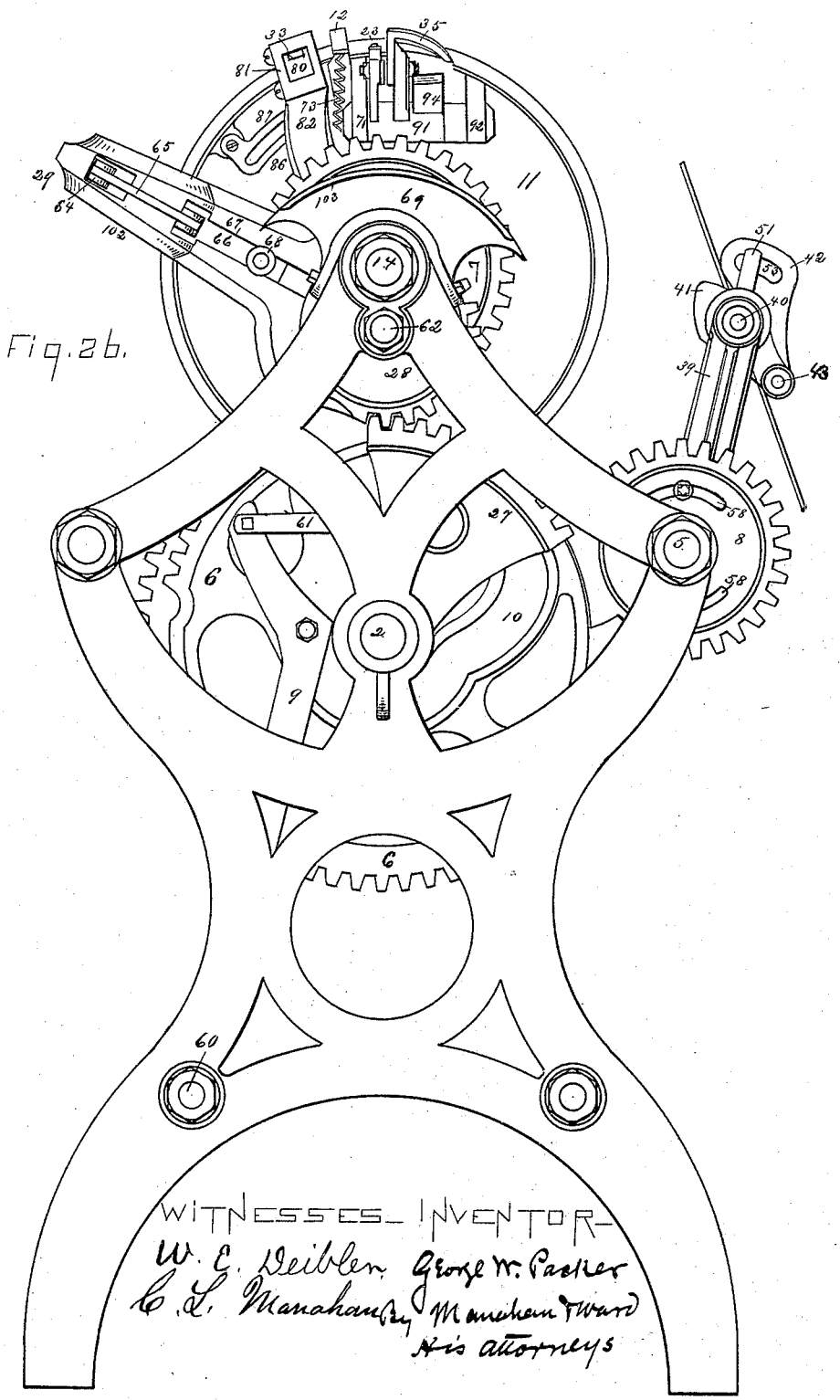

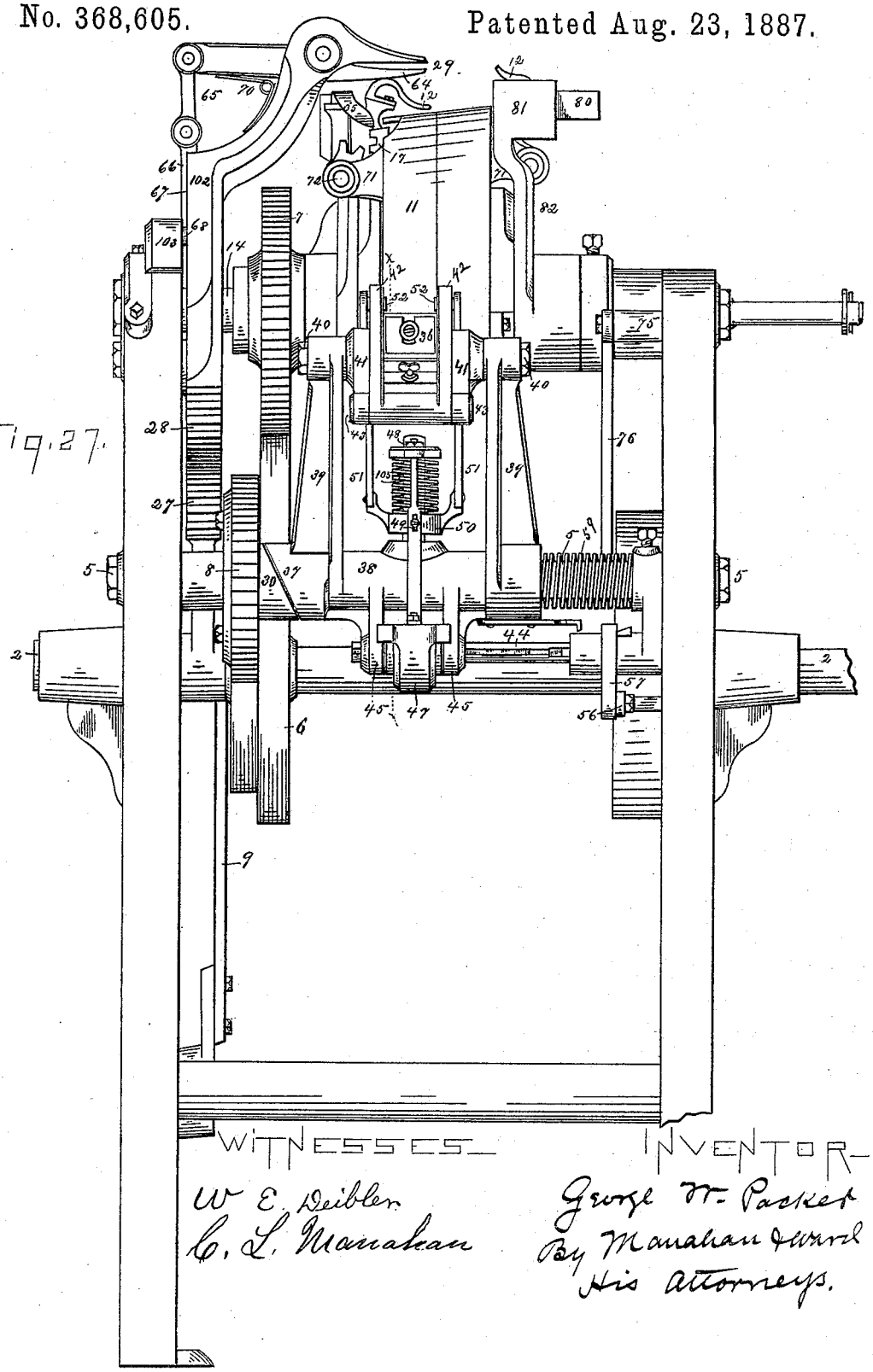

(No Model.)  17 Sheets—Sheet 17.
G. W. PACKER.
HOOP MAKING MACHINE.
No. 368,605. Patented Aug. 23, 1887.
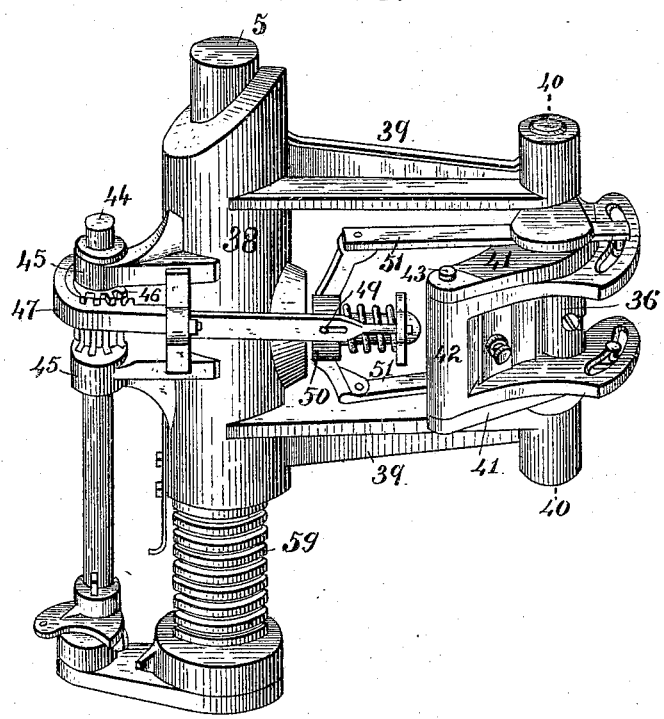
Witnesses
J. Henry Kaiser
Victor J. Evans
Inventor
George W. Packer
By his Attorneys
Manahan & Ward

UNITED STATES PATENT OFFICE.

GEORGE W. PACKER, OF ROCK FALLS, ILLINOIS.

HOOP-MAKING MACHINE.

SPECIFICATION forming part of Letters Patent No. 368,605, dated August 23, 1887.

Application filed March 26, 1887. Serial No. 232,489. (No model.)

*To all whom it may concern:*

Be it known that I, GEORGE W. PACKER, a citizen of the United States, residing at Rock Falls, in the county of Whiteside and State of Illinois, have invented certain new and useful Improvements in Hoop-Making Machines; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention has reference to a machine for making wooden barrel and cask hoops. It involves the mechanism necessary for taking the hoop from its crude condition and leaving it in a finished state, ready for having its ends interlocked and being placed on the barrel or cask. As is well known, wooden hoops, when finished, have lateral notches in reverse at each end, by which the hoop is held in a circular form. In order that the ends may interlock, so that the notches may mutually engage, it is necessary not only that the ends of the hoops, respectively, pass under the main body thereof, but also that the portion of the hoop which constitutes the outer angles of the notch shall be tapered down to allow said notches to cross each other laterally to make the lock. All casks and barrels which are held together by hoops have tapering exteriors, to afford opportunity for the tightening of the hoops by driving the latter toward the larger circumference.

The process of measuring and shaping the hoop must be had with reference to this conical or tapering form of the exterior of the cask. It is also true that in hoops of varying thickness, although of the same length, when in a straight form, and before bending, there will be experienced a varying in the length of their reach or inner circumference when bent in a circle, for the reason, perhaps, that the degree of cramping on the inside of the hoop and the degree of stretching on the outside of the hoop varies with the transverse diameter of the hoop; and, also, the longitudinal center of a thick hoop when bent in a circle around a forming-body will have a larger circumference to describe than would be the case with a thinner hoop. It is obvious, then, that a machine which shall successfully automatically measure a hoop before it is made to be of a certain circumference when finished must be adapted to measure under the same conditions that the hoop will meet when put into practical use. To meet these last requirements I measure my hoops on a drum having substantially the rotundity and taper of the future cask.

In the manufacture of the hoop from the original hoop pole or strip to the condition in which it is ready for placing on the cask there are involved the following steps to successful completion: First, the hoop must have its inner and outer surfaces shaved so that its transverse diameter perpendicular to the cask shall be the same throughout its contacting surface; second, the hoop is to be measured in reference to the circumference of the cask upon which it is designed to be placed, and also with reference to the location thereon of the interlocking-notches; third, cutting the two interlocking-notches on opposite sides of the hoop and locating one on each end thereof; fourth, the paring away of the hoop at the outside of the outer angle of the notches aforesaid, so as to permit the two ends of the hoop to interlock at that point by the mutual engagement of the notches; fifth, the paring or tapering down to a feather-edge of that portion of each end of the hoop which extends beyond the notches, so that such pared ends may be projected, respectively, under the hoop and hold the notches in engagement without creating any more additional thickness under the hoop than can be avoided. Some of these operations are carried on in the machine coincidently—for instance, one end of the hoop is projected a short distance through between the shaving-knives before any operation of the latter, (the shaving of this latter projected end being subsequently effected by what we shall term the "lap-knife,") and is there seized by the gripper, which travels a short distance over and partially around the measuring-drum, dragging the hoop partially through the shaving-knives and then releasing the hoop. The hoop just before its release by the gripper is instantly seized between a clamp and the periphery of the drum, such clamp rocking over the edge of the drum for that purpose. Then the drum begins its revolution, and the hoop is thereby drawn through the shaving-knives, and thus is continued the process begun by the gripper. This latter process is hardly begun before the first notching-knife, which is located near the clamp last aforesaid, rocks from the outside of the drum down through the recess formed in the edge of the latter, of a shape which will be that of the finished notch, and cuts the first notch in said hoop. This notching-knife, after performing its aforesaid function, passes about a third of its length through the rim of the drum, and there remains until the last lock is cut, as hereinafter stated. The notching-knife just mentioned is carried with the drum in its revolution, and, as it partially projects beyond the periphery of the latter, it furnishes a stop against which the end of the perpendicular wall of the notch rests, and the notching-knife therefore assists the clamp in holding the hoop against any retrogression in the farther process of finishing the latter. At the same time that the notching-knife aforesaid begins its operations the lap-knife, which is located adjacent to the clamp last named, and on the side thereof opposite to the notching-knife and farther advanced in the line of the rotation of the drum, and which has been brought over the rim of the drum outside of the hoop at the same time that the clamp seized the latter, is given a circular movement in advance of the drum and slightly toward the periphery of the latter, and cuts the first lap and remains on top of the extreme end of the latter, holding the latter down against the periphery of the drum. At the same time that the notching-knife was rocking forward toward the drum the fitting-knife, which is located close to the front end of the notching-knife, as aforesaid, is forced over the edge of the drum, in an oblique upward direction and cuts the outer end of the engaging-wall of the notch obliquely upward from its outer extremity, thus fitting that corner of the notch for the lateral passage on the outside of it of the back wall of the notch in putting the hoop together.

The process thus described finishes one end of the hoop, and the drum continuing its rotation draws the residue of the hoop through between the shaving-knives. The drum makes one complete revolution and no more in the manufacture of each hoop, and during the process of the shaving of the latter end of the hoop the shaving-knives are forced laterally and parallel with the periphery of the drum over to the opposite portion of the latter, so as to be in line with the portion of the periphery of the drum next to that edge of the latter opposite to the edge in which the operation was begun. This side movement of the shaving-knives carries the hoop diagonally over the periphery of the drum, and near the opposite edge of the latter. At this opposite side of the drum there are provided the elements of mechanism which are counterparts of those involved, as aforesaid, in finishing the first end of the hoop—that is to say, before the hoop has been entirely drawn through the shaving-knives, it is seized near its rear end by a clamp acting precisely as the one first named, and held thereby down upon the periphery of the drum. At this point the second lap-knife, the counterpart of the one first named, except that it advances in the opposite direction, is given an orbital movement and passes down and finishes the second lap, or the lap at the rear end of the hoop. Coincident with the paring of the last end of the hoop the second notching-knife and the second fitting-knife cut and finish the second notch, the operation being substantially the same as that involved in cutting the first notch, except that the notch is in the reversed position. The hoop is now finished, and both of the clamps release it. It is necessary that each notch shall extend halfway across the hoop, and no farther, so that when the notches are mutually engaged the main portion of the hoop shall be in the same line. To this end centering-crotches are seated adjustable radially in the periphery of the drum adjacent to the clamps aforesaid by means of their spring-shank being notched at its outer end to the inner face of the periphery of the drum, Fig. 10, and serve the double purpose of centering the hoop at that point and also assisting to prevent its lateral slipping in the process of cutting the lateral notches. The centering-crotches aforesaid have their engaging outer ends formed with inwardly-sloping sides, so as to be adapted to receive hoops of varying widths. The advantage of the adjustable feature of the seated crotch is that at whatever point in the crotch the hoop may be suspended by reason of the crotch receding toward the center of the drum the hoop is always held down by the clamp firmly upon the periphery of the drum, so as to furnish solid resistance against the action of the notching and fitting knives aforesaid.

The operation, which I have attempted to describe in a general way, finishes the hoop, and it can then be taken off by hand, or be discharged automatically by the machine. I have had for several months one of my machines in operative condition, and have attached thereto an automatic discharge for the hoops and mechanism for counting the latter; but as the essential mechanism, hereinafter to be more specifically described, is sufficiently complex, I do not deem it advantageous to encumber this application with the auxiliary mechanism for discharging and counting the hoops.

Figure 2:
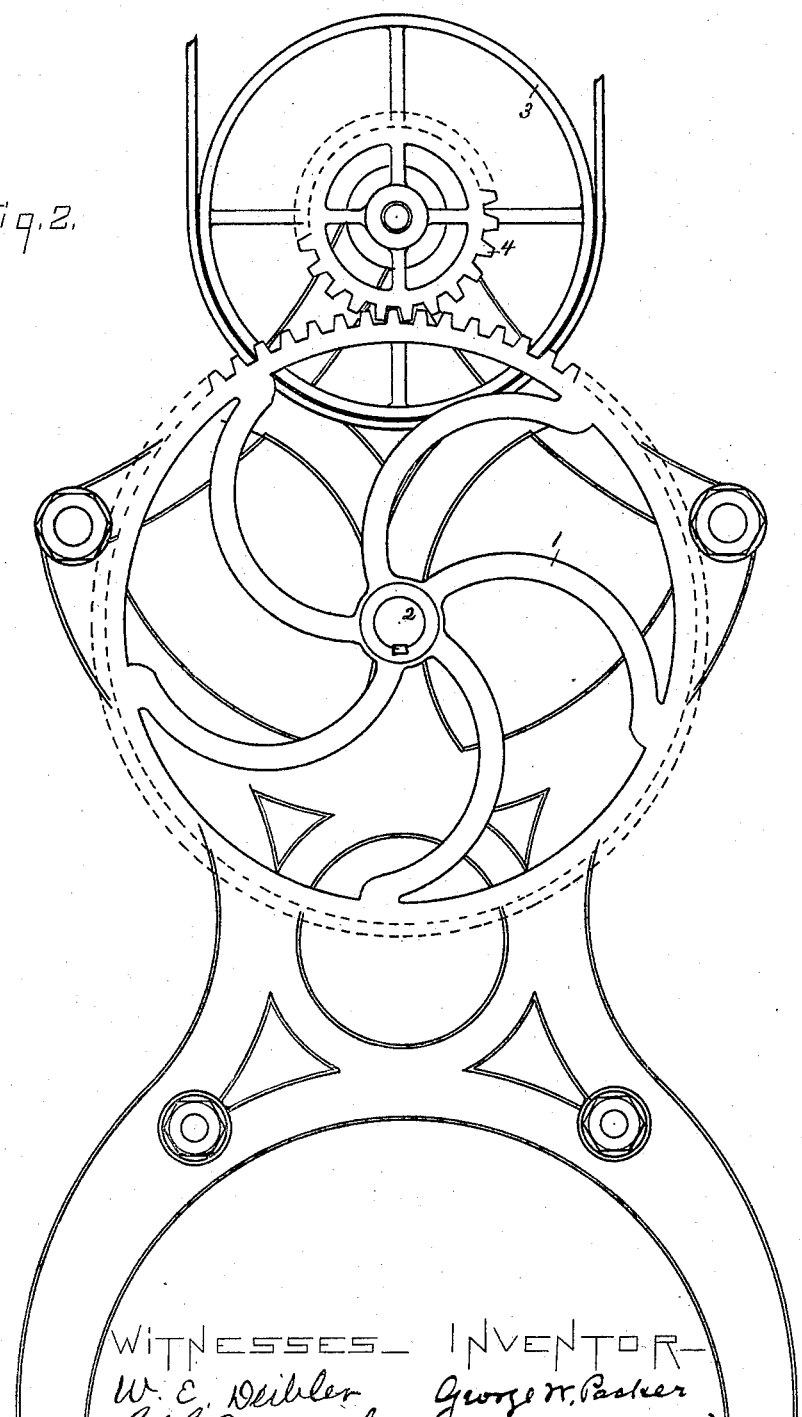
Figure 3:
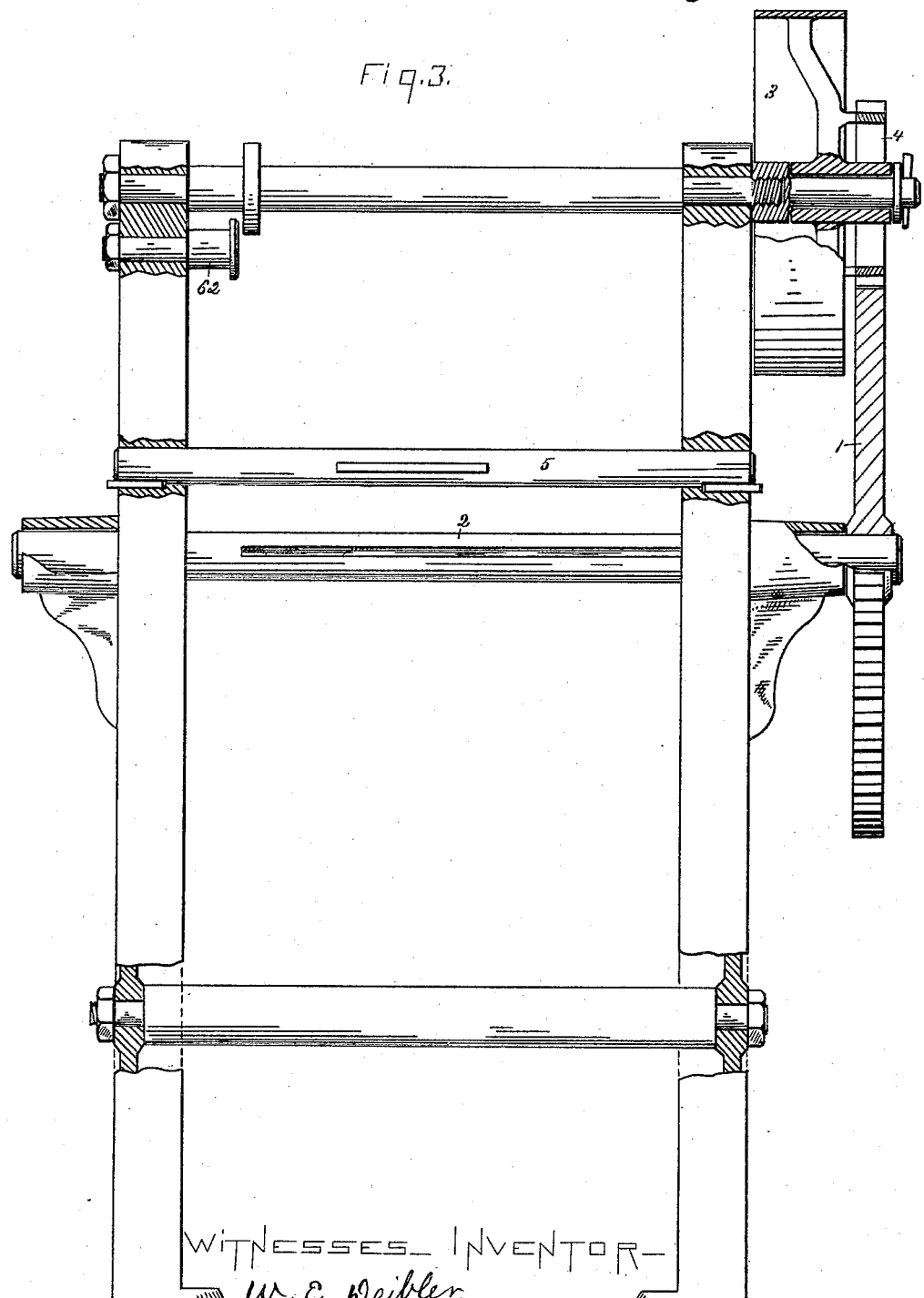
Figure 4:
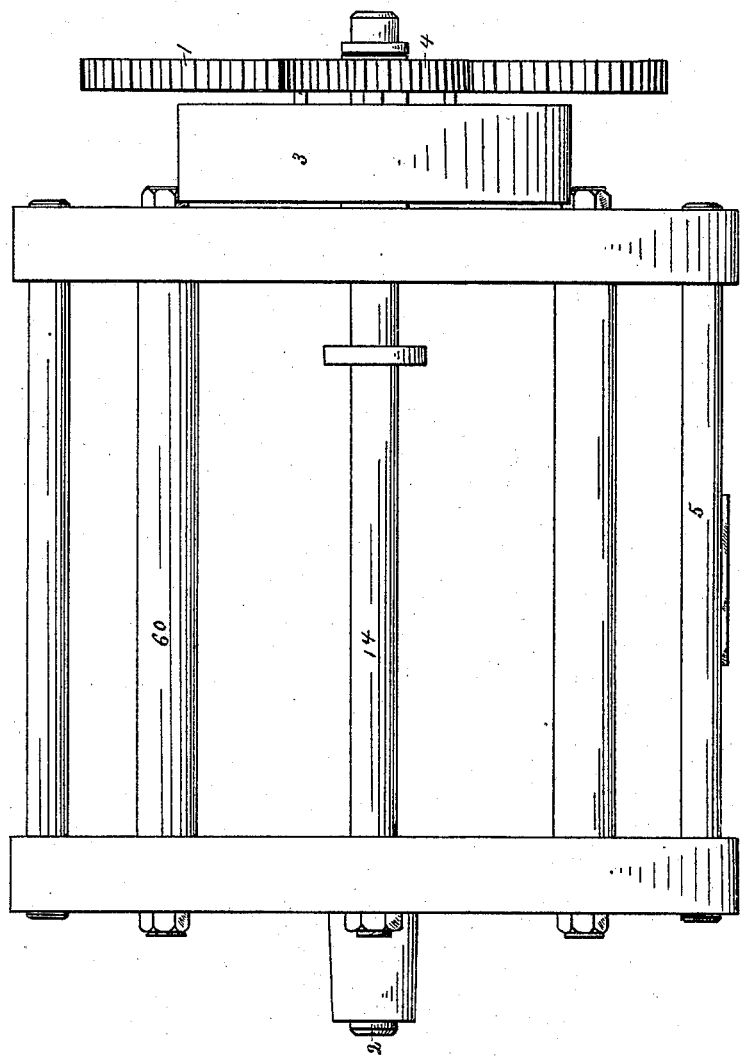
Figure 5:
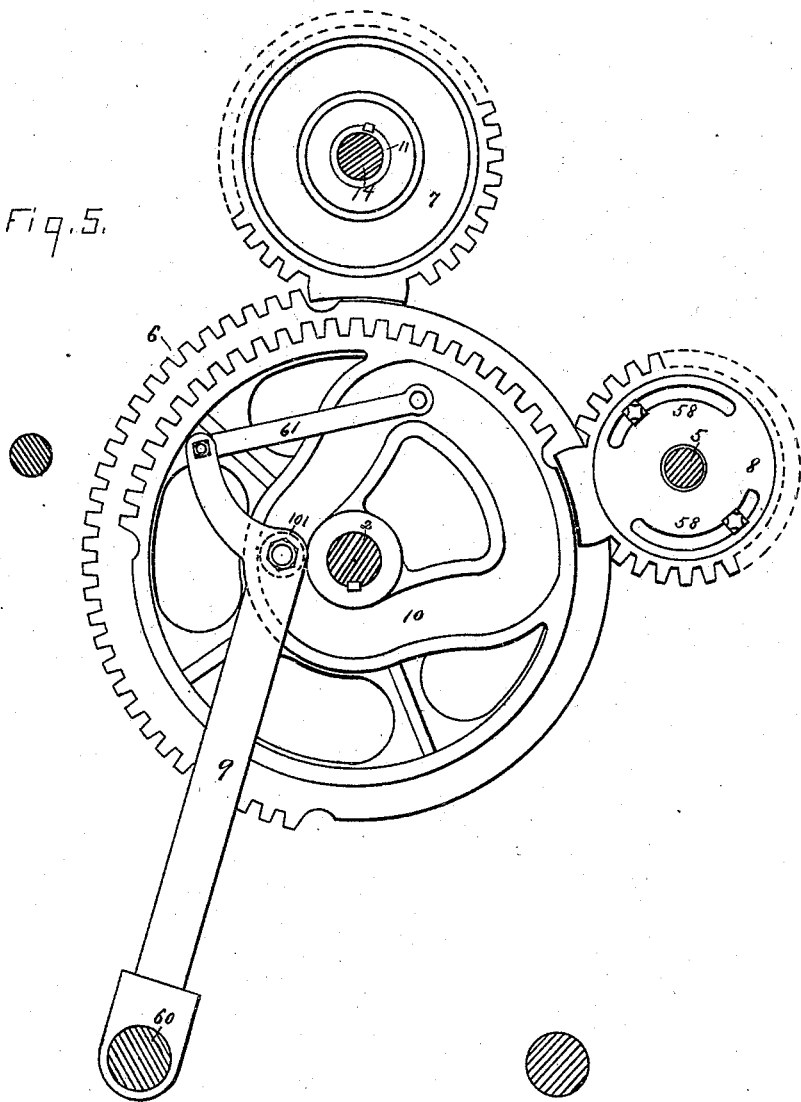

In the drawings, Figure 1 is an elevation of one end of the main frame of the machine, both sides being the same in size and shape. Fig. 2 is an end elevation, showing the position of the gear-wheel 1, which is keyed to the central rotating shaft, 2, and also the driving-pulley 3, integral with which is the driving-pinion 4, which actuates the gear 1. The cogs on the gear-wheel 1 extend around the whole circumference, although in the drawings it was not deemed necessary to more than partially extend them. Fig. 3 is a front elevation, showing the central rotating shaft, 2, which is the only rotating shaft in the machine, and also the stationary shaft 5, which furnishes the seat for the paring-knives. Fig. 4 is a top view of the frame. Fig. 5 is a detail giving the side elevation of the cam and mutilated gear-wheel 6, keyed on the central rotating shaft, 2, and the imposed mutilated pinion 7, attached to the hub of the measuring-drum, and which moves the said drum intermittently; also, mutilated pinion 8, which actuates the hoop-shaving devices laterally; also, the arm 9, which, by traversing the cam 10 on gear-wheel 6, gives to the gripper orbital movement. Fig. 6 is a cross-section of the drum 11, showing the location thereon of the clamps 12; also, the sleeve 13, which rocks on the fixed shaft 14, and on which one-half of the drum 11 revolves; also, the two mutilated gear and cam wheels 15 and 16, which are keyed within the drum 11 to the sleeve 13 opposite and contiguous to each other, the cam being on the inner face of said wheels 15 and 16 and operating radially the racks 17 and 18, which actuate, respectively, the clamps 12. The gear of the wheels 15 and 16 actuate, respectively, the mutilated pinions 19 and 20, the latter being seated on bolts 21, screwed into the drum 11, and having wrist-pins 22 projected laterally beyond the line of the drum. Fig. 7 is a section in the line $x\,x$ of Fig. 9 of the one-half of the drum 11 which is seated loosely on the shaft 14. Fig. 8 is a detail of a portion of the same one-half of the drum 11, showing the place and means of bolting the other half of the drum thereto. Fig. 9 is an end elevation of the mechanism on that face of the drum 11 farthest from the driving-pulley 3, with the pinion 7, the notching-knife, the lap-knife, and the fitting-knife removed. Fig. 10 is a partial view of Fig. 9, showing the lock-knife 23 and centering-crotch 24. Fig. 11 is a partial view of Fig. 7, showing the location of the lock-knife 23. Fig. 12 is a detail of the centering-crotch 24. Fig. 13 is a partial view of the outside of that half of the drum 11 in which are curved slots 25, to afford means to change the relative position of one half of the drum to the other half to vary the distance between the respective mechanism for notching and finishing the ends of the hoop, so as to make hoops of different lengths. It is to be understood that the drum 11 consists of two circular halves, each of which halves carry mechanism for notching and finishing one end of the hoop, and by twisting one of these halves more or less past the other the distance between the respective notching and finishing knives is varied and the drum thereby adjusted to make hoops of different lengths. Fig. 14 exhibits one side of the cam-wheel 26 keyed to the rotating shaft 2, controlling the action of the clamps 12 through the medium of the sleeve 13 and the cams on the mutilated gear and cam wheels 15 and 16, the external gear on wheels 15 and 16 contributing to the action of the different knives heretofore mentioned.

Figures 15, 16:
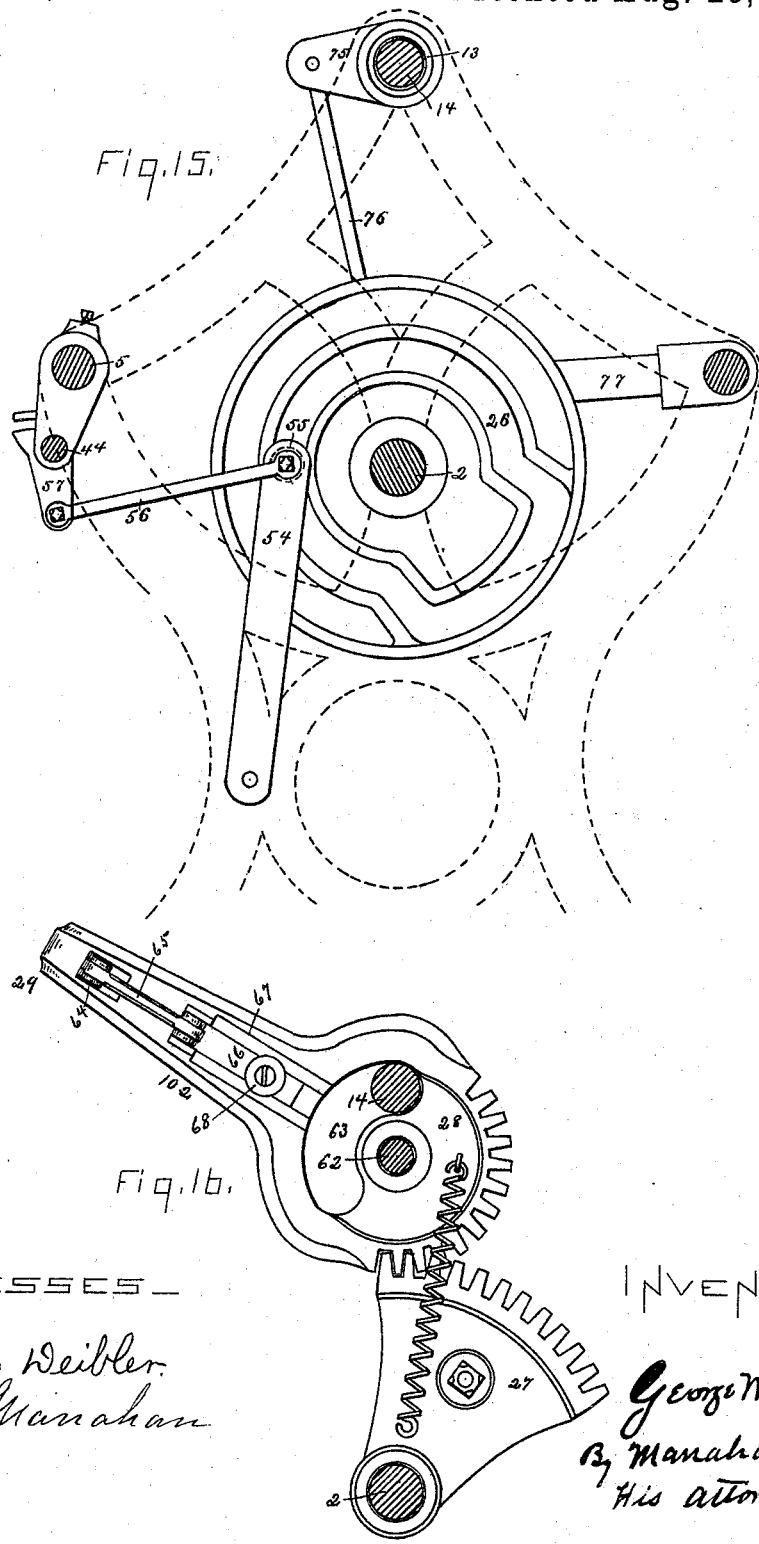
Figure 28:
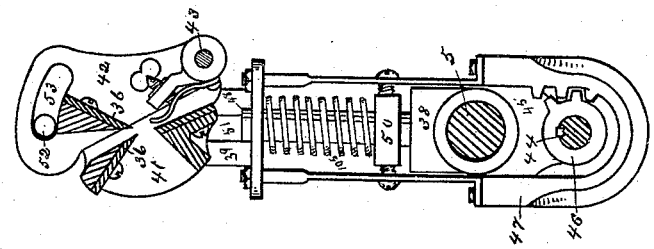
Figure 22:
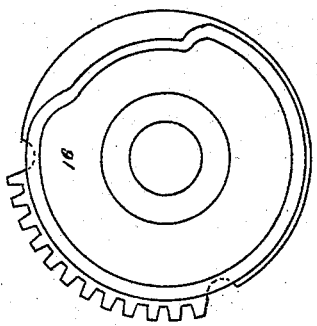
Figure 21:
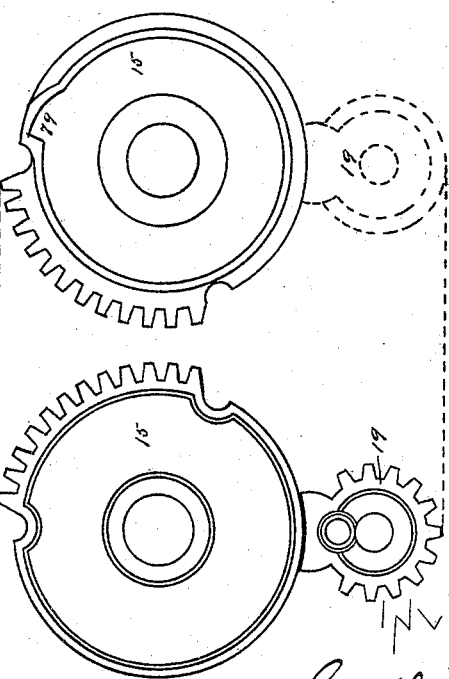

Fig. 15 is a view of the opposite side of the cam-wheel 26, provided with a different cam which opens and closes and trips the duplex shaving-knives 36, which shave the hoop. Fig. 16 is a detail of the segmental gears 27 and 28, which actuate the gripper 29, and which are themselves actuated from the cam of the gear-wheel 6. Fig. 17 is a side view of the mutilated pinion 8, seated loosely on the shaft which carries the shaving-knives 36, and whose function is to impart lateral movement to the sleeve 38, which carries said knives. Fig. 18 is a top view of the same pinion 8. Fig. 19 is a view of the spiral cam 30, integral with the inner face of the pinion 8, which is the direct agency for throwing laterally the sleeve which carries the shaving-knives. Fig. 20 is a side elevation of the spiral cam 30, adjustably attached to pinion 8. Fig. 21 are details of the mutilated gear and cam wheel 15, which actuates the first clamp 12, showing the opposite face of said wheel, and also the pinion 19, operated by said wheel, and which pinion 19 operates one of the yokes 32, which controls the first series of different knives, as hereinafter stated. Fig. 22 is a side view of the cam-wheel 16, which actuates the last clamp 12, and pinion 20, which, through the second yoke 32, actuates the last series of knives. Fig. 23 is a detail of one-half of the drum 11, exhibiting part of the mechanism for oscillating the lock-knife 23. Fig. 24 shows details of the lap-knife 33 and the segmental gear 34, which, actuated by the yoke 32, gives the said knife its orbital movement partially around the drum 11. Fig. 25 shows details of the notching-knife 35. Fig. 26 is a side elevation of the machine, showing the relative location of the parts and the position of the shaving-knives 36 relative to the drum 11. Fig. 27 is a front elevation of the machine. Fig. 28 is a vertical section of the shaving-knives and their adjacent mechanism in the line $x\,x$ of Fig. 27. Fig. 29 is a perspective of the knives 36 and their immediate operating mechanism.

I will now proceed to describe the machine more in detail, and as the only mode in which it seems practicable to make a description which can be understood I will begin with the first step in the process of making a hoop and follow such process through in the sequence in which it occurs in the machine.

A fixed horizontal shaft, 5, which furnishes the seat for the shaving-knives 36, is fixed in the frame parallel with the axis of the measuring-drum 11, and in such altitude relative to the axis of said drum as that when the knives 36 are supported on the shaft 5 they are about as high as the center of the drum 11 and opposite to the latter about four inches from its periphery. A sleeve, 38, is feathered on the shaft 5, so as to be susceptible of lateral movement thereon and to be held against any oscillation to or from the drum 11. Two arms, 39, are formed on the sleeve 38, integral therewith, extending upward, and by means of transverse bolts 40, passed loosely through the top of the arms 39, and screwed into the lower knife-block, 41, form pivotal supports for said block 41, in the upper end of which is seated adjustably one of the shaving-knives 36, having its horizontal edge extending downward. The upper companion knife-block, 42, is pivoted at its lower end to the lower end of the block 41 by means of short transverse bolts 43, which are passed inward loosely through block 41 and screwed in the block 42, respectively, and thus form the mutual pivots of said blocks. Block 42 contains the other shaving-knife 36, which has its cutting-edge horizontal and is projected downward.

The knives 36 are arranged to approach or recede from each other, and adjust themselves to the thickness of variant hoops, having their pivotal action on the bolts 43; but the knives 36 are so seated that at all times a line drawn through the center of the bolts 40 would be midway between and parallel with the cutting-edges of the knives 36. This latter is an essential feature of the machine, because the center of the hoop, whatever its thickness, will always be in the transverse line through the center of the bolts 40, and the cutting-edges of the respective knives, whatever the oscillation of the latter, are thus always the same distance from the center of the hoop. The knives 36 are left free to oscillate automatically on the bolts 40, so as to follow the sinuosities of the hoop.

In shaving the hoop sometimes most of the resistance will be on one side of the latter, sometimes upon the other. Wherever the greater resistance for the time may be, the tendency will be to oscillate the knives in that direction, and the cutting-edges of the knives being arranged, as aforesaid, equidistant from the said central line through the bolts 40, whatever the degree of oscillation of said knives, they are both always about the same distance from said central line, and therefore capable of following the bends or crooks in the hoops and shaving the hoop throughout the same thickness, regardless of any bends or crookedness that may be in the latter.

The lower horizontal rock-shaft, 44, is suspended from the shaft 5 below and parallel with the latter, so as to extend inward beyond the line of the blocks 41 and 42, and projects through bearings 45, formed on the lower surface of the sleeve 38. Between the bearings 45 there is feathered on the rock-shaft 44 a small pinion, 46, which engages and actuates a gear formed on the inner side of the vertical stirrup 47. The upper end of this stirrup is sleeved on the vertical pin 48, projected upward from the sleeve 38 between the arms 39, and thus said stirrup is held from lateral movement while permitted the necessary vertical action to regulate the opening and closing of the shaving-knives 36. Supported on the stirrup 47 in vertical slots 49 therein is a horizontal collar, 50, also sleeved on the pin 48 below the upper end of stirrup 47.

To the opposite sides of the collar 50 are attached the lower ends of the upwardly-extending arms 51, on the upper ends of which are inwardly-projecting studs 52, which are seated in segmental slots 53 in the upper knife-block, 42. A coiled spring, 105, seated around pin 48, between collar 50 and the upper end of stirrup 47, holds upper knife-block, 42, adjustably down, a slight rising of said block being permitted by slots 49 to open the knives 36 to admit thicker hoops. The arms 51 through the medium of the stirrup 47, by raising and lowering the upper knife-block, 42, open and close the shaving-knives 36, and the segmental slots 53 prevent the arms 54 from interfering with the essential oscillation aforesaid of the knife-blocks 41 and 42. The arm 54, Fig. 15, is pivoted at its lower end to the frame of the machine, and at its upper end is provided on its inner face with the horizontal friction-roller 55, which roller traverses the cam-groove formed in the outer face of the cam 26, (the inner face of said cam being shown in Fig. 14.) A pitman, 56, is pivoted at its inner end to the upper end of the arm 54, and, extending outward, is pivotally attached at its outer end to a collar, 57, keyed on the horizontal rock-shaft 44, and thus the latter is positively and intermittently rocked to impart the necessary oscillation to the pinion 46. On the outer end of the shaft 44 is formed a head, and such shaft rocks in a bearing which suspends it from the shaft 5. On the opposite end of the shaft 5 is loosely seated a mutilated pinion, 8, the inner face of which is shown in Fig. 17, and which is drawn by the smaller gear of the wheel 6. (Shown in Fig. 5.) To the inner face of the wheel 8 is adjustably bolted, through the segmental slots 58 on said wheel, the spiral cam 30, the latter being also loosely seated on the shaft 5 and carried by the wheel 8. The adjacent end of the sleeve 38 is furnished with the spiral cam 37, (shown in Fig. 17,) which in the rotation of the wheel 6 is engaged and actuated by the spiral cam 30, and thus the sleeve 38, which carries the shaving-knives 36, is forced laterally during the process of making a hoop, so as to carry the latter across the periphery of the drum 11 in the interval between the making of the two notches. When the last notch is completed, a spiral spring, 59, seated on the opposite end of the shaft 5, throws the sleeve 38 back into its original position, the aforesaid spiral cams having passed meanwhile beyond the point of their mutual engagement. When the upper knife-block, 42, through the medium of the pinion 46 on the rock-shaft 44, has been drawn down, so as to close the shaving-knives to their proper position, the projecting inner end of the hoop is seized by the gripper 29, and by the latter drawn through said shaving-knives, as aforesaid. The gripper in the process of drawing the hoop between the shaving-knives performs an orbital movement partially around the drum 11, and is actuated as follows:

The arm 9, Fig. 5, is pivoted at its lower end to the horizontal column 60, and is provided at its upper end with a friction-roller, 101, which traverses the cam 10 on the gear-wheel 6. The pitman 61 connects the upper end of the arm 9 to the segmental gear 27, which latter is loosely seated on the central rotating shaft, 2. The segmental gear 27 engages and actuates the segmental gear 28, which is formed on the lower end of the shank 102 of the gripper 29, said shank being pivoted on the short horizontal post 62, projected inwardly through the frame of the machine. Said shank is further provided with the segmental slot 63, through which the fixed shaft 14 extends, and which permits the necessary oscillation of said shank, regardless of the fixed shaft 14. The upper jaw of the gripper is integral with its shank 102. The lower jaw, 64, of the gripper is pivoted in the upper jaw thereof, and extends outwardly from the latter, and is pivotally attached at its outer end to the short vertical pitman 65, which is pivotally attached at its opposite end to the vertical plunger 66, which travels in ways 67, formed in the back of the shank 102 of the gripper 29.

On the outer face of the plunger 66 is seated a friction-roller, 68, which, in the oscillation of the gripper 29, traverses and is controlled by a suitable cam, 103, formed on the inner face of a plate, 69, Fig. 26, bolted to the top of the frame of the machine. A coiled spring, 70, suitably attached externally to the gripper 29 and to the outer end of the jaw 64, holds the latter open except when controlled by the pitman 65. The plunger 66 aforesaid, and the cam 103 on the plate 69, which controls the latter-named parts, is of such conformation as to permit the jaws of the gripper to open when the latter lies down near the shaving-knives in position to receive the hoop, and as soon as the gripper begins its oscillation said cam closes the jaws thereof upon the hoop and holds them thus closed until the gripper has reached the end of its oscillation or orbital movement, when it permits the spring 70 to open the jaws of the gripper, and the latter is carried thus open over and beyond the end of the hoop, so as to disengage the latter. A short time before the gripper 29 has completed the arc of its oscillation and the instant the gripper begins to release its hold upon the hoop, the first clamp 12 rocks over on the edge of the drum outside of the hoop, and is forcibly drawn toward the center of the drum, clamping the hoop down upon the periphery of the latter, thus permitting the gripper to pass on over the end of the hoop and to cease to have any further connection therewith.

The gripper 29 enables me to make hoops larger than the circumference of the drum 11.

The movement of the clamp 12 is necessarily complex. It is rocked over the periphery of the drum in an arc, and this movement draws it down upon the hoop. It is afterward rocked from the drum, and this movement releases its hold upon the hoop and at the same time removes the clamp from the periphery of the drum to make room for the next hoop. The drum 11, as will be seen in Fig. 6, as before stated, is composed of two halves, and the clamps 12 are rotated respectively on each half, and are seated alike and actuated substantially alike, the only difference being a slight variation in the cams 15 and 16, which operate them respectively, so that one clamp is held to the drum somewhat longer than the other.

The clamp 12 is seated pivotally near the rim of the drum 11, transversely of such drum, on the flange 71 by means of a pivot, 72, through the shank of the clamp. A coiled spring, 73, adjustably attached at one end to an exterior extension on the flange 71, and at its other end to the back of the clamp 12, near its top, serves to rock the top of the clamp outward, and by means of gear on the opposite end of the shank of the clamp intermeshing with the rack 17 to press said rack radially outward and cause the friction-roller 74 on the lower end of said rack to follow the outer wall of the cams 15 and 16. The racks 17 and 18 are seated in radial ways in the drum 11, and furnished at their lower ends with friction-rollers 74, which traverse the outer walls of the cams 15 and 16, respectively. Therefore the rocking of the clamps 12 over upon the periphery of the drum 11 is a positive movement, caused by the engagement of the friction-rollers 74 in the cams 15 and 16, while the withdrawal or release of the clamps is an automatic movement, occasioned by the spring 73 aforesaid. As the movements of both cams 15 and 16 are alike, it will be necessary to describe the movements of but one.

The cam 15 has first two partial rotations in a contrary direction from that of the drum, and then one partial rotation in the same direction as the drum equal in extent to both of the said former partial rotations in the contrary direction. The cam 15 is keyed upon the sleeve 13, seated loosely on the fixed shaft 14, and said cam receives its movements from said sleeve 13. This sleeve 13 extends to the side of the frame next to the driving-pulley 3, and has its outer extremity keyed to (see Fig. 14) an oscillating arm, 75, through which said sleeve first receives its rocking movements, as follows: From the outer end of the arm 75 is extended downward a pitman, 76, pivotally attached at its upper end to said arm and at its lower end to the inner end of an oscillating arm, 77, the outer end of which is pivotally seated on one of the horizontal columns which hold the frame together. At the point of junction of the pitman 76 and the arm 77, and on the outer face of the arm 77, is seated the friction-roller 78, which traverses the inner face of the cam 26. The cam 26 is keyed to the centrally-rotating shaft 2, and of course rotates continuously; but the conformation of the inner face of the cam 26 is such that during part of the period of the rotation of the latter the arm 77 is stationary, and during the residue of such rotation such rocking is imparted to said sleeve 13 as is required to produce the aforesaid movement of the clamp 12. During some of the stationary intervals of the arm 77 the clamp 12 is being held down upon the hoop. During another of the stationary intervals of said arm the clamp 12 is permitted to be thrown back and held out of engagement by the spring 73. A view of the face of the cam 15 is given in Fig. 21, and it will be there seen that the path of the friction-roller 74 is a circle, with the exception of the recess 79 in said cam, in which recess the roller 74 rests during the period that the clamp 12 is open. In Fig. 22 is shown the cam 16, which operates the other clamp 12 and exhibits the slight difference in the form of the cams 15 and 16. Coincidently with the rocking of the clamp 12 over the rim of the drum 11 the lap-knife 33 is projected over said rim outside of the hoop, and afterward has an orbital movement in advance of the hoop, so as to form the lap on the hoop. The lap-knife 33 is attached to the block 80, which lies loosely in the transvere sleeve 81 in the upper end of the arm 82, the lower end of which is loosely seated on an eccentric, 83, formed on the hub of the drum 11.

A recess is formed in the lower surface of the block 80, in which the upper end of the bell-crank lever 85 loosely plays. Said lever is pivoted at its angle transversely of the arm 82, and is actuated by its lower end being projected within and carried by the slots 86, formed in arm 87, the lower end of said arm being pivotally attached to the drum 11. (See Figs. 9 and 10.) The upper end of the arm 87 is pivotally attached to the side of the rack 17, before mentioned, (see Fig. 23,) and by the radial movement of said rack the arm 87 is oscillated transversely of the drum 11. As the rack 17 moves toward the center of the drum, it draws down the lower end of the lever 85 and carries the knife 33 over the hoop. The upper end of the arm 87 being attached to the same rack that actuates the clamp 12, the movements of the knife 33 are always coincident with those of the clamp 12. The orbital movement of the lap-knife 33 for the purpose of cutting the lap on the hoop is produced through the medium of the gear 34 on the arm 82, which gear is engaged and actuated by the internal gear, 88, on the yoke 32. The purpose of seating the arm 82 eccentrically on the hub of the drum 11 is to cause the lap-knife 33 in its orbital movement to approach the periphery of said drum, so as to cut the lap of the hoop down to a feather-edge.

The yoke 32 is reciprocated in ways 89, formed on the face of the drum 11, Fig. 9, and said yoke is actuated by means of the wrist-pins 22 on the face of the mutilated pinion 19, said wrist-pin having its play in the large slot 90, formed in the lower end of the yoke 32. The pinion 19 receives an intermittent rotation by being thus carried by the drum 11 over and into engagement with the external gear on the cam 15. The notching-knife 35 is carried on the sleeve 91 integral therewith. The sleeve 91 is seated loosely on a pin, 93, one end of which is held in the flange 71 and the other end in a corresponding flange, 92, on the side of the drum 11, and said sleeve 91 is rocked by means of segmental gear 94 on the inner face thereof, which is engaged and actuated by the gear 95 on the upper end of the yoke 32, Fig. 9.

The fitting-knife 23, which, as aforesaid, cuts a bevel on the outer angle or edge of the notch in the hoop, is carried on an oscillating arm, 96, being screwed upon the front end of said arm, and the opposite end of said arm being pivotally attached to the flange 71 next to the notching-knife 35 and slightly below and within the axis of the latter. The segmental cam 97 is formed on the end of the sleeve 91, behind the arm 96, and when said sleeve is rocked toward the drum, as hereinbefore explained, the flange 97 abuts against the rear side of the arm 96 and oscillates it toward the center of said drum coincidently with the operation of the notching-knife 35, thereby cutting the required bevel on the upper side of the outer corner of the notch in the hoop.

A spring, 98, suitably seated between the face of the drum 11 and the adjacent arm 96, throws the latter arm back, carrying the knife 23 from the periphery of said drum as soon as the sleeve 91 and its cam 97 are rocked back.

Intermittent rotation is imparted to the drum 11 through the mutilated pinion 7, attached thereto, which engages and is actuated by the larger gear on the cam gear-wheel 6, keyed to the main driving or rotating shaft 2. After the operation aforesaid of notching and cutting the lap and finishing the notch of the hoop said drum 11 continues its rotation until it makes a complete revolution, which results in drawing the hoop entirely through the shaving-knives 36. During this continuous rotation of the drum 11 by means of the lateral movement before described of the shaving-knives 36 the hoop has been carried diagonally across the periphery of the drum 11 until it lies near that edge of the latter opposite to the edge from which it started. Just before the hoop has escaped entirely from the shaving-knives 36 it is seized by the second clamp 12 and held down upon the periphery of the drum 11, when substantially the same operation of paring the lap, cutting the notch, and beveling the angle of the latter is performed by the second series of knives for that purpose, the latter operating in substantial accordance with the description given of the first series of knives, except as the notches are in reverse each series of knives act in the direction the reverse of the other. After the last end of the hoop has been finished both clamps are released and the finished hoop is ready for removal.

The lateral half of the drum 11 next the driving-pulley 3 is separate from and adjustable upon the other half. The use and purpose of this separation and adjustment is to adapt the drum to the manufacture of hoops for different-sized casks and necessarily of varying lengths. In all hoops the notches are about the same distance from the respective ends of the hoop, so that the variation in size of the hoops results in the difference in the spaces between the notches thereof. The said adjustment of the one half of the drum 11 upon the other half thereof is accomplished by the formation of curved slots 25 in the movable half, and bolts 99, projected through said slots and screwed into threaded seats in the other half of said drum.

Washers 100 are interposed between the heads of the bolts 99 and the adjacent face of the slots 25, projecting laterally over the walls of the latter. The first half of the drum 11 rotates on a fixed shaft, 14, and the second half of said drum rotates on the sleeve 13, and is carried with the first half by means of the lateral attachment thereto last before described. The distance between the notches on the hoop is varied by moving the second half of the drum 11 back and forth on the bolts 99, it being obvious that the farther around the drum contrary to the direction of rotation of the latter the series of knives carried by the second half of the drum are moved from the first series of said knives the greater will be the distance between the notches on the hoop, so as to require greater length of hoop to reach from one series of knives to the other. A scale, 104, is formed on the wall of one of the slots 25, to indicate the point of adjustment necessary to make hoops of any required length.

The rotation of the drum 11 is intermitted when the smooth portions of the peripheries of the mutilated pinion 7 and mutilated gear-wheel 6 come opposite to each other, and it is at this point, while the drum 11 is thus stationary, that the gripper 29 seizes and first advances the hoop, as before mentioned.

The essential parts of my invention are the devices for shaving the hoop and the measuring-drum, all other parts being more or less subordinate and incidental.

Means for drawing the hoop used in connection with the devices for shaving the hoop would be substantially an independent structure, (although a proper part of my present machine,) and could be used separate and distinct from the other parts of the machine. For instance, the shaving-knives 36, with their adjunctive mechanism for permitting them to automatically adjust themselves in relation to each other, could be supported in a separate frame, and various easily-suggested methods adopted for drawing the hoop through between the cutting-surfaces of said knives. The valuable central idea which I conceive to be embodied in the shaving-knives is that of their automatic mutual adjustment about the line drawn longitudinally through the center of the supporting-bolts 40, by means whereof said knives are allowed to oscillate so as to follow the sinuosities and crooks in the hoop and reduce the latter to one uniform thickness throughout. Such a machine, embodying solely the shaving-knives, would be invaluable to those who prepare the straight strips or hoop timber for market; also, the measuring and finishing drum 11 can be utilized distinct from the shaving-knives 36, the hoop being fed to said drum by hand or otherwise.

The conical form of the periphery of the drum 11 I do not deem indispensable, as a periphery parallel with the axis of the drum would answer the purpose practically about as well.

Other means somewhat variant from those herein shown may in the light of this invention be employed to support and actuate the shaving-knives 36 without departing from the spirit of my invention. So, also, the various knives carried on the measuring-drum 11 might be seated and operated by well-known mechanical equivalents for the parts herein employed for that purpose, and I therefore do not intend to limit my claims to the specific form or relation of the parts herein shown; but

What I claim as my invention, and desire to secure by Letters Patent of the United States, is—

1. In a hoop-making machine, the combination of transverse bolts 40, interconnected blocks 41 and 42, and the two shaving-knives 36, pivotally seated laterally on the transverse bolts 40 as their center of oscillation, and in such relation to said pivot that a line drawn longitudinally through said bolts 40 will be between and equidistant from the cutting-edges of said knives in every position of the latter, substantially as shown, and for the purpose described.

2. In a hoop-making machine, shaving-knives 36, seated, respectively, in blocks 41 and 42, mutually hinged and supported laterally on pivot-bolts 40, the cutting-edge of said knives being equidistant from and substantially parallel with the longitudinal center line of bolts 40, and adapted, substantially as shown, to oscillate about said center line, for the purpose specified.

3. In a hoop-making machine, the combination of a rotating drum, 11, and notching-knife 35, fitting-knife 23, and lap-knife 33, said knives being carried on said drum and adapted, substantially in the mode shown, to be rocked, for the purpose herein specified.

4. In a hoop-making machine, the rotating drum 11, adapted to cut hoops of various predetermined lengths by being constructed of two parts adjustable upon each other, each part carrying knives to notch and finish the opposite ends of the hoop, substantially as shown.

5. In a hoop-making machine, the combination of the rotating drum 11, constructed of two halves adjustable upon each other, notching-knives 35, fitting-knives 23, and lap-knives 33, seated upon and operating, respectively, substantially as shown, with each of said halves, and mechanism, substantially as shown, for actuating said knives, for the purpose herein mentioned.

6. In a hoop-making machine, the combination of a rotating drum, 11, and notching-knives 35, fitting-knives 23, and lap-knives 33, and clamp 12, adapted, respectively, to rock over the periphery of said drum, mechanism, substantially as shown, for actuating said knives and clamp, and the shaving-knives 36, seated, substantially as shown, in line with the rim of said drum, for the purpose described.

7. In a hoop-making machine, the combination of the rotating drum 11, carrying clamps 12 and notching and finishing knives, the gripper 29, and shaving-knives 36, substantially as shown, and for the purpose described.

8. In a hoop-making machine, the combination of a rotating drum, 11, clamps 12, seated in said drum, lap-knives 33, notching-knives 35, fitting-knives 23, carried on said drum, shaving-knives 36, and gripper 29, substantially as shown, and for the purpose described.

9. In a hoop-making machine, the combination of a rotating drum carrying knives for notching and finishing the hoop, shaving-knives 36, seated opposite the periphery of said drum, and mechanism, substantially as shown, for moving said shaving-knives laterally during the rotation of said drum, whereby the hoop is carried across the periphery of said drum.

In testimony whereof I affix my signature in presence of two witnesses.

GEORGE W. PACKER.

Witnesses:
GEORGE H. DRAKE,
THOMAS A. GALT.